United States Patent
Saha et al.

(10) Patent No.: US 7,730,208 B2
(45) Date of Patent: Jun. 1, 2010

(54) METHOD AND SYSTEM FOR CENTRALLY EXCHANGING TERMINAL INFORMATION OVER A MESHED NETWORK

(75) Inventors: Abheek Saha, New Delhi (IN); Anthony Noerpel, Lovettsville, VA (US); Hongjun Li, Beltsville, MD (US); Robert Torres, New Market, MD (US); Sandeep Verma, New Delhi (IN); Mahesh Kamath, New Delhi (IN); Craig Schweinhart, Rockville, MD (US)

(73) Assignee: Hughes Network Systems, Inc., Germantown, MD (US)

( * ) Notice: Subject to any disclaimer, the term of this patent is extended or adjusted under 35 U.S.C. 154(b) by 783 days.

(21) Appl. No.: 10/142,594

(22) Filed: May 9, 2002

(65) Prior Publication Data

US 2003/0212822 A1 Nov. 13, 2003

(51) Int. Cl.
*G06F 15/16* (2006.01)
*G06F 15/173* (2006.01)

(52) U.S. Cl. ...................... 709/244; 709/245
(58) Field of Classification Search ......... 370/255–352, 370/394, 490; 709/202–245; 717/168–174; 713/170; 455/12.1
See application file for complete search history.

(56) References Cited

U.S. PATENT DOCUMENTS

| | | | | |
|---|---|---|---|---|
| 4,274,139 A | * | 6/1981 | Hodgkinson et al. | 709/203 |
| 4,979,170 A | * | 12/1990 | Gilhousen et al. | 370/321 |
| 5,471,615 A | * | 11/1995 | Amatsu et al. | 709/202 |
| 5,485,455 A | * | 1/1996 | Dobbins et al. | 370/255 |
| 5,506,847 A | * | 4/1996 | Shobatake | 370/338 |
| 5,708,679 A | * | 1/1998 | Fernandes et al. | 375/259 |
| 5,790,546 A | * | 8/1998 | Dobbins et al. | 370/400 |
| 5,841,765 A | * | 11/1998 | Fielding et al. | 370/319 |
| 6,052,364 A | * | 4/2000 | Chalmers et al. | 370/312 |
| 6,058,115 A | | 5/2000 | Sawyer et al. | |
| 6,097,706 A | * | 8/2000 | Fielding et al. | 370/319 |
| 6,272,152 B1 | * | 8/2001 | Levin et al. | 370/490 |
| 6,493,342 B1 | * | 12/2002 | Breslow et al. | 370/394 |
| 6,535,716 B1 | * | 3/2003 | Reichman et al. | 455/12.1 |
| 6,591,306 B1 | * | 7/2003 | Redlich | 709/245 |
| 6,792,474 B1 | * | 9/2004 | Hopprich et al. | 709/245 |
| 6,885,660 B2 | * | 4/2005 | Inbar et al. | 370/352 |
| 6,894,990 B1 | * | 5/2005 | Agarwal et al. | 370/321 |
| 6,904,265 B1 | * | 6/2005 | Valdivia et al. | 455/12.1 |
| 2002/0046286 A1 | * | 4/2002 | Caldwell et al. | 709/229 |
| 2002/0138728 A1 | * | 9/2002 | Parfenov et al. | 713/170 |

FOREIGN PATENT DOCUMENTS

EP 0 797 337 A2 3/1997
EP 1 139 631 A1 3/2000

\* cited by examiner

*Primary Examiner*—Van H Nguyen
(74) *Attorney, Agent, or Firm*—K&L Gates LLP

(57) ABSTRACT

An approach is provided for communicating in a meshed network including a first terminal and a second terminal. A request from the first terminal for obtaining address information of the second terminal is submitted to a hub. The hub generates a response including the address information and the context information that specifies capabilities of the second terminal. This arrangement has particular applicability to a satellite network (e.g., Very Small Aperture Terminal (VSAT) network) that provides data communication services.

28 Claims, 11 Drawing Sheets

METHOD AND SYSTEM FOR CENTRALLY EXCHANGING TERMINAL INFORMATION OVER A MESHED NETWORK

RELATED APPLICATIONS

The present application is related to U.S. patent application Ser. No. 10/140,717, filed on May 8, 2002, entitled "Method and System for Providing Peer-to-Peer Exchange of Terminal Information Over a Meshed Network," the contents of which are hereby incorporated by reference.

FIELD OF THE INVENTION

The present invention relates to a communications system having multiple terminals, and more particularly to maintaining interoperability among the terminals of different capabilities.

BACKGROUND OF THE INVENTION

Modern satellite communication systems provide a pervasive and reliable infrastructure to distribute voice, data, and video signals for global exchange and broadcast of information. These satellite communication systems have emerged as a viable option to terrestrial communication systems for carrying Internet traffic as well as telephony traffic. With the convergence of voice, data, and video services, service providers need to continually adapt their networks to new and evolving technologies, and yet retain interoperability with traditional telecommunication services. Given the maturity of traditional circuit switched services, integration of new technologies and standards pose a particularly significant challenge, particularly with respect to customer premise equipment, such as satellite terminals.

Once satellite terminals are deployed, obsolescence is problematic, particularly given the rapid advancements in communication technology. Thus, upgrade of a system or certain aspects of its services is unavoidable. In fact, it is typical that upgrades are performed several times over the course of the life of a system. The migration path for the upgrade needs to account for the ability to add new protocols, new messages, new information elements, and new code points to the system without adversely affecting the ability of existing STs to receive service. While existing STs may not be able to take advantage of the newer services, these STs should not be prohibited from operating with their existing services or be expected to be upgraded to continue to operate with their existing services.

One conventional approach to upgrading is referred to as "versioning." Versioning conceptually does not distinguish between a major system upgrade (e.g., complete redefinition of system messaging and protocols) and a minor system upgrade (e.g., addition of messages or code points).

This concept of versioning has a number of drawbacks, making it an ineffective solution for minor as well as major upgrades. First, future advancement of ST functionality may be impeded. For instance, since later developed STs will have significantly better hardware capabilities, future versions of a common air interface, for example, may be able to take advantage of capabilities that currently are infeasible or not yet conceived. That is, upgrading versions of the common air interface would either limit future terminals to run software that is limited by current hardware platforms, or require customers to upgrade all of their terminal hardware and/or software to accommodate the latest versions. Neither of these outcomes is desirable, as the former deters implementing advances in hardware/software capabilities, and the later introduces costs that may be unwarranted, especially if customers are content with the functionalities of their existing terminals and services.

Another drawback with the versioning approach concerns management of upgrades, which may involve hundreds of thousands of STs; consequently, scalability presents a concern. For example, in a system in which two versions of STs exist, the implication is that no terminal is more than one version behind the latest version in the system. Thus, all STs at version X−1 need to be upgraded to at least Version X before Version X+1 can be deployed; further, all STs at version X−1 need software upgrades. Ensuring that all existing Version X−1 terminals are upgraded in time such that those terminals are not useless after switchover is a monumental task. Further, the versioning approach may result in an out-of-date terminal supply. Terminals that occupy warehouse shelves may become out-of-date by several version numbers by the time they are deployed.

Based on the foregoing, there is a clear need for improved approaches for addressing system upgrades while maintaining interoperability. There is also a need to enhance scalability. Additionally, there is a need to minimize obsolescence. There is also a need to minimize development and implementation costs. There is also a further need to interoperate with existing standards and protocols. Therefore, an upgrade approach that permits adoption of advances in hardware and software is highly desirable.

SUMMARY OF THE INVENTION

These and other needs are addressed by the present invention, wherein an approach is provided for maintaining interoperability among multiple terminals, which may be of differing types and capabilities, in a meshed network. In such mesh network, in general, terminal capabilities include, but are not limited to the following: an encryption scheme, a compression scheme, a segmentation and reassembly (SAR) scheme, Quality-of-Service (QoS) parameters, power levels, modulation and coding schemes, power control algorithms, link adaptation capabilities, automatic repeat request (ARQ) protocols and mechanisms, and any other terminal capability (e.g., data link layer functionalities) which needs to be conveyed to a peer terminal in order to support communications. Through a context negotiation procedure, the terminals learn of the other terminals' capabilities. A terminal requesting the context information of a destination terminal may submit a request for the context information as well as address information (e.g., Medium Access Control (MAC) address) during an address resolution procedure. If the address information is available and only the context information is needed, the context negotiation procedure is performed on a peer-to-peer basis, in which the terminals directly communicate with each other to convey the context information. According to one embodiment of the present invention, the terminals are Very Small Aperture Terminals (VSATs) and are configured to provide connectivity to multiple hosts to a data communications network, such as an Internet Protocol (IP)-based network. Under this arrangement, obsolescence of terminals is advantageously minimized. Additionally, this arrangement advantageously facilitates transparent introduction of new terminals with improved features and functionalities, while providing compatibility with older terminals. Furthermore, communications through the hub permits implementation of security and traffic management functions.

According to one aspect of the present invention, a method is provided for retrieving context information over a meshed network. The method includes generating a request for obtaining address information of a terminal. The method also includes transmitting the request to a hub within the meshed network. Further, the method includes receiving a response from the hub, wherein the response includes the address information and the context information that specifies capabilities of the terminal.

According to another aspect of the present invention, a terminal apparatus is provided for retrieving context information over a meshed network. The apparatus includes a processor that is configured to generate a request for obtaining address information of a terminal, wherein the request is forwarded to a hub within the meshed network. Also, the apparatus includes a communications interface that is configured to receive a response from the hub. The response includes the address information and the context information that specifies capabilities of the terminal.

According to another aspect of the present invention, a computer-readable medium carrying one or more sequences of one or more instructions for retrieving context information over a meshed network is disclosed. When executed by one or more processors, the instructions cause the one or more processors to perform the steps of generating a request for obtaining address information of a terminal. Other steps include transmitting the request to a hub within the meshed network, and receiving a response from the hub. The response includes the address information and the context information that specifies capabilities of the terminal.

According to another aspect of the present invention, a device is provided for retrieving context information over a meshed network is disclosed. The device includes means for generating a request for obtaining address information of a terminal, and means for transmitting the request to a hub within the meshed network. The device also includes means for receiving a response from the hub, wherein the response includes the address information and the context information that specifies capabilities of the terminal.

According to another aspect of the present invention, a method is provided for communicating in a meshed network including a first terminal and a second terminal. The method includes receiving a request from the first terminal for obtaining address information of the second terminal. The method also includes generating a response including the address information and the context information that specifies capabilities of the second terminal.

According to another aspect of the present invention, a method is provided for retrieving context information over a meshed network. The method includes determining whether address information of a terminal is stored locally. The method also includes selectively generating a request, based on the determining step, for the address information and the context information that specifies capabilities of the terminal. The request is forwarded to a hub within the meshed network.

According to another aspect of the present invention, a computer-readable medium carrying one or more sequences of one or more instructions for retrieving context information over a meshed network is disclosed. When executed by one or more processors, the instructions cause the one or more processors to perform the steps of determining whether address information of a terminal is stored locally, and selectively generating a request, based on the determining step, for the address information and the context information that specifies capabilities of the terminal. The request is forwarded to a hub within the meshed network.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, device, and software for providing communication compatibility among a plurality of terminals having meshed connectivity are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
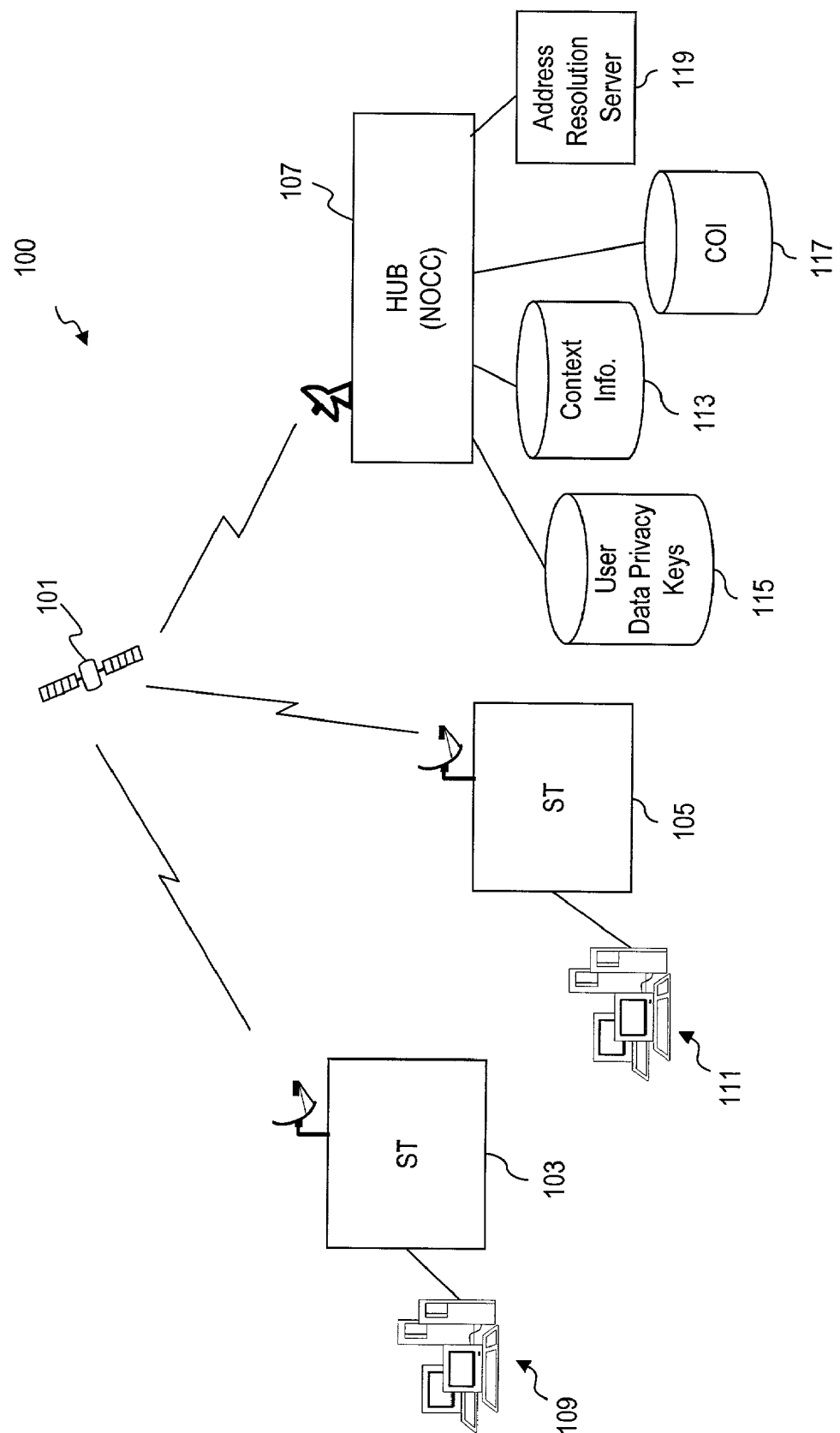
FIG. 1 is a diagram of an exemplary meshed network capable of supporting communication among terminals with varied capabilities, according to an embodiment of the present invention.

FIG. 1 is a diagram of an exemplary meshed network capable of supporting communication among terminals with varied capabilities, according to an embodiment of the present invention. A communications system 100 includes a satellite 101 that supports communication among multiple satellite terminals (STs) 103, 105 and a hub 107. The hub 107 may assume the role of a Network Operations Control Center (NOCC), which controls the access of the STs 103, 105 to the network 100 and also provides element management functions and control of the address resolution and resource management functionality. The satellite 101, in an exemplary embodiment, operates as a packet switch (e.g., at a data link layer) that provides direct unicast and multicast communication among the STs 103, 105. The STs 103, 105 provide connectivity to one or more hosts 109, 111, respectively. According to one embodiment of the present invention, the system 100 has a fully meshed architecture, whereby the STs 103, 105 may directly communicate.

As previously discussed, a system in which terminals are deployed, particularly a satellite system, incompatibility problems may arise if different "generations" of terminals exist, in which one ST employs older hardware and/or software technologies than the other.

For newer, highly capable terminals to communicate with older (typically) less capable terminals, an exchange of information regarding the capabilities among the communicating terminals is needed. Specifically, the common air interface needs to support a discovery of the terminal's capabilities profile (or context information). These capabilities can include encryption scheme, compression scheme, segmentation and reassembly (SAR) scheme, automatic repeat request (ARQ) scheme, Quality-of-Service (QoS) parameters, power levels, modulation and coding schemes, power control algorithms, and link adaptation capabilities.

Under a conventional approach, terminal profile can be readily exchanged over a network with a star topology where no peer-to-peer communication exists. For example, in the General Packet Radio Service (GPRS)/Universal Mobile Telecommunications System (UMTS) family of protocols, such capabilities profiles include a packet data protocol (PDP) context and a mobility management context. In an embodiment of the present invention, the concepts of PDP context and mobility management context are combined and the term packet data protocol (PDP) context is used in general to refer to terminal capabilities. It is recognized that these terminals can be mobile as well as non-mobile. In an exemplary embodiment, this PDP context, for example, which can provide information about the encryption algorithm, compression algorithm, modes of data link layer communication, and physical layer transfer capabilities is combined by the transmit ST with the Quality of Service (QoS) of a pending data flow to determine a packet transfer context to use in transmission of the flow. If a PDP context has been previously established, then the sending ST can autonomously create the packet transfer context, which both satisfies the QoS of the data flow and is compatible with the receive ST capabilities.

According to an embodiment of the present invention, the exchange of terminal profile can be executed over a meshed network, in a peer-to-peer manner. The STs 103, 105 support the use of a negotiation procedure (as more fully described below with respect to FIGS. 6, 7a, and 7b) to determine the optimal configuration for transmission and reception of data. If a protocol implements control procedures or options in newer versions (i.e., flow-control/rate-control), older protocol versions are able to detect the initiation as a new unsupported procedure and report the same to the peer with minimal disruption in the flow of traffic.

The ST-ST protocol advantageously takes into account that even for peers of the same version, some capabilities may not necessarily be always supported due to local temporal processing/memory/congestion-related constraints. Additionally, the ST-ST protocol design provides for rapid developments in data communication technology.

Incompatibility between two STs is detected by the terminal that originates the traffic. Thus, potential misconfigurations or software incompatibilities can at least be identified, without requiring communication at the service level of the more capable ST. For example, one of the STs 103, 105 may need to be reconfigured in order to communicate with compression disabled in order to allow communication with an ST that does not support compression. It is noted that the capability is not necessarily a function of solely configuration or software compatibility, but may also be a function of current traffic load.

For each ST 103, 105, there exist some configuration information, including network configuration, network service provider (NSP) configuration, software configuration, and user configuration, as indicated by the NOCC 107. These configurations relate to the features that the ST 103, 105 supports and offers to the user, and have a direct bearing on the transmission and reception capabilities. In general, these configurations are relatively static. The system 100 permits exchange of this configuration information, which is referred to as "PDP context information." The PDP context information, in an exemplary embodiment, is associated with a Medium Access Control (MAC) destination address of an ST 103, 105 and is stored locally in the respective STs 103, 105.

To facilitate the flow of data from one peer ST 103 to another ST 105 of possibly different generations equipped with different capabilities, a packet transfer context is employed. Such a common feature set depends on the PDP contexts of the two STs 103, 105; further, this common feature set may also depend on the QoS of the flow, as well as the loading and status of the two STs at that point of time. In an exemplary embodiment, the packet transfer context is unidirectional and valid only for the transmit ST to send packets to the specified receive ST; thus, the packet transfer context may be unique to a given pair of STs.

According to one embodiment of the present invention, the packet transfer context is prepared locally by an ST 103 out of the static PDP context of itself and the peer ST 105. As mentioned, this context may be further influenced by the QoS requirements of the data needing to be transferred, and the current loading and status of both itself and its peer, if available.

A packet transfer context is created whenever the two STs 103, 105 need to communicate, and there is no packet transfer context available. The context may be deleted when there is no communication between the two STs.

According to one embodiment of the present invention, two functional or representative timers for PDP context information are utilized: an Expiry Timer, and an Idle Timer. A PDP context Expiry Timer is used to control the total amount of time the PDP context information associated with a specified ST can exist in the local ST. This timer is set immediately after its associated PDP context information is received. No event within the ST 103, 105 can stop and/or reset this timer. When the PDP context Expiry Timer goes off, the corresponding PDP context information becomes invalid and gets flushed out of the cache. New PDP context information associated with this ST is required if further communication with this ST is needed.

The PDP context Idle Timer, which is optional, may be set immediately after its associated PDP context information is received. In contrast to the PDP context Expiry Timer, this timer is reset every time the corresponding PDP context information is queried to generate a packet transfer context.

These timers may be constructed based on the memory constraints of the terminal. For example, a hub ST may need to have relatively short timers because of memory constraints and a remote, consumer oriented ST in a star-like network, may have relatively long timer values.

As seen in FIG. 1, the hub 107 provides, according to one embodiment of the present invention, a central database 113 that stores context information of the STs 103, 105. The entries of the database 113 may be indexed by the respective MAC addresses of the STs 103, 105. In an exemplary embodiment, the database 113 is populated based on registration messages that are exchange with the NOCC 107 and the STs 103, 105 during commissioning.

Additionally, the hub 107 includes a security database 115 that stores privacy keys for each of the STs 103, 105 in support of the security functionalities of the NOCC 107. The hub 107 also provides traffic management by maintaining a database 117 that stores community of interest (COI) information such that traffic is circulated only to certain STs associated with a particular COI.

Figure 2:
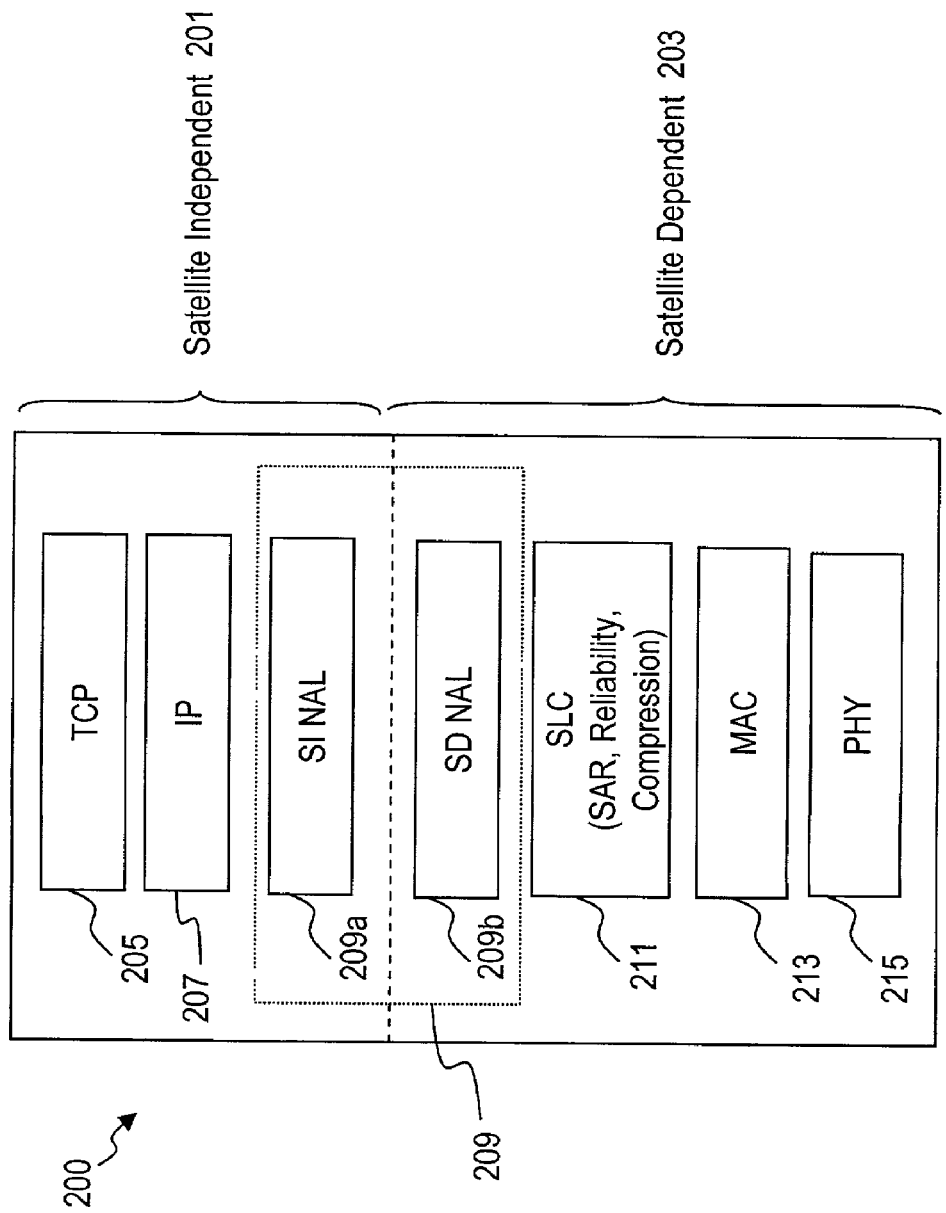
FIG. 2 is a diagram of a format of a communication protocol stack for supporting data communication over the network of FIG. 1.

Furthermore, the hub 107 supports an address resolution function through the use of an Address Resolution (AR) server 119. The AR server 119, according to an embodiment of the present invention, resolves protocol addresses (e.g., IP addresses) to physical machine addresses (e.g., MAC addresses) via an Address Resolution Protocol (ARP). This protocol may be employed with a context negotiation procedure, as more fully described with respect to FIGS. 8-10. FIG. 2 shows an exemplary interface capable of supporting this procedure.

FIG. 2 is a diagram of a format of a communication protocol stack for supporting data communication over the network of FIG. 1. A common air interface (CAI) 200 is utilized by the system 100 and includes a network independent layer 201 and a network dependent layer 203. The network independent layer 201, according to an embodiment of the present invention, includes a Transmission Control Protocol (TCP) layer 205, an Internet Protocol (IP) layer 207, and a Network Adaptation Layer (NAL) 209, a SLC layer 211, a Medium Access Control (MAC) layer 213, and a physical (PHY) layer 215. The NAL 209 adapts network-layer packets to suit link-layer specifics and has two portions: a Satellite Independent (SI) component 209a, and a Satellite Dependent (SD) component 209b.

The Network Adaptation Layer (NAL) 209 operates at the networking layer level and has the following responsibilities. The NAL 209 receives IP packets and interprets, if present, Class of Service (CoS) tags to break up the incoming packet stream to flows, assigning the following handling parameters for each flow: User Data Transport Service (Constant Rate, Variable Rate etc) to be provided by the MAC layer 215; Transmission mode (acknowledged/unacknowledged) and encryption mode (encrypted/unencrypted) to be provided by Satellite Link Control (SLC).

The Data Link layer is composed of the SLC layer 211 and the MAC layer 213. The SLC layer 211 handles all functions required just before data packets are transmitted and just after the receptions of data packets both in acknowledged mode of data transfer and unacknowledged mode of data transfer. The Medium Access Control (MAC) layer 213 handles access of physical channel and bandwidth on-demand functionality, which are necessary before user data transfer can be initiated.

Specifically, the SLC layer 211 is responsible for end-to-end packet delivery from one ST to the other. Based on the reliability requirement of data stream being transmitted through Processing Satellite network, the SLC layer 211 can have two modes of operation: SLC unacknowledged (SLC-Unack) mode and SLC acknowledged (SLC-Ack) mode. In SLC-Ack mode, reliable delivery of the data is ensured using a modified sliding-window Automatic Repeat Request (ARQ) protocol. In SLC-Unack mode, data is sent from the sender to the receiver in a sequential stream without any feedback channel.

The functional responsibilities of the SLC layer 211 are as follows. The SLC layer 211 provides generation of session IDs and mapping incoming packets into the corresponding session. Encryption of specific NAL Protocol Data Units (PDUs) for user-to-user data privacy is also supported by the SLC layer 211. Additionally, the SLC layer 211 provides segmentation of application PDUs and attachment of appropriate SLC headers. At the receive ST, the corresponding SLC entity has to reassemble application PDUs. Further, the SLC layer 211 ensures that the delivery of data is in-sequence to the peer when using the reliable/unreliable mode of delivery is employed.

The SLC layer 211 also provides capability recognition and reconciliation procedures at start of session. When two STs of different capabilities have to communicate with each other, the transmit ST starts off with a transmission mode set to what it believes the receiver can support and then based on feedback from the receiver, it may modify the mode to a more compatible and/or optimal one.

Packets from the NAL 209 are delivered to SLC layer 211 with the parameters like service class, reliability criteria, drop class, etc. There can be many instances of this interface at given time. Conceptually each instance is associated with a single SLC-entity and is created when the NAL 209 creates the SLC entity. The SLC is dynamically created and deleted when the SLC session is terminated. It is noted that a single SLC session only supports a single NAL entity.

Figure 4:
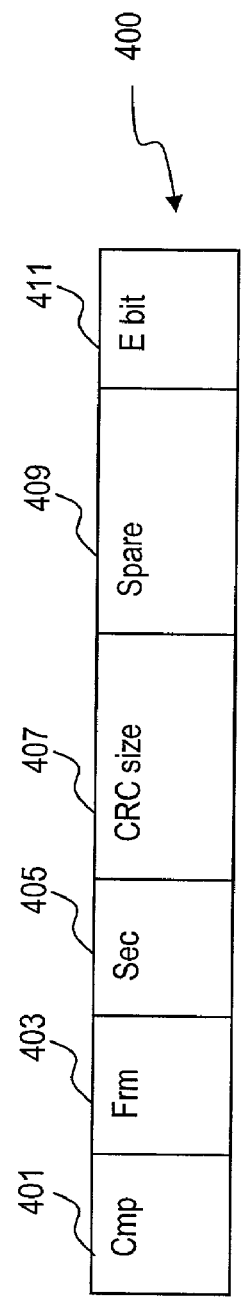
FIG. 4 is a diagram of a format of the header of the SLC packet utilized in the system of FIG. 1.

There is no multiplexing or demultiplexing functionality in the SLC layer 211, to combine separate application level streams into a single SLC session. The SLC PDUs may contain application or functionality specific headers i.e. frame header, security header (as shown in FIG. 4). The SLC layer 211 combines these headers with the data stream on command and extract them on the receiving side; however, they need not be processed in any other way, but passed transparently to the NAL 209.

The services provided by SLC layer 211 to the NAL 209 are as follows. As noted above, the SLC layer 211 supports generation of session IDs and mapping incoming packets into the corresponding session. The services of the SLC layer 211 also include an acknowledged mode and an unacknowledged mode of IP PDU delivery. Another service is Segmentation and Reassembly (SAR) of the NAL PDU. The SLC layer 211 further supports optional compression of IP PDUs on a per-session basis, as well as optional to encrypt information on a per-flow basis. Capability recognition and reconciliation procedures at start of a session are supported by the SLC layer 211.

As discussed above, given the need to accommodate feature enhancements to the ST during the lifetime of the system, the system needs to handle potential incompatibilities (temporary or permanent) between STs of different generations at, for example, the Data Link Layer (e.g., SLC/MAC). In other words, the system is required to ensure the basic operation of older terminals as well as ensuring that a mixture of older and newer terminals of various vintages.

A number of areas of incompatibilities at the Data Link Layer may exist. For example, newer STs may implement SLC-acknowledged mode and attempt to communicate with an older ST that only supports SLC-unacknowledged mode. Also, the newer ST may employ new encryption or compression techniques at the Data Link layer that are not supported by the older ST. In addition, segmentation and reassembly (SAR) algorithms may be different. Further, protocol incompatibilities may arise; e.g., new field definitions may not be understood by the older ST.

Once a packet arrives at the MAC layers through the packet filter of a receive ST, the receive ST determines from the fields whether or not it can process the fields. Upon receiving a packet with the MAC and SLC headers coded as expected (i.e., no incompatibilities), an ST continues processing the packet. According to one embodiment of the present invention, a SLC packet has a format of that shown in FIG. 3.

By way of example, it is assumed that a second generation ST 103 supports SLC-ACK mode data transfer. There is need to transfer packet data to a second ST 105. Normally, ST 103 would query its database for the ST's MAC-destination address. Associated with the address would be the PDP context for ST 105. Whether or not ST 105 supports SLC-ACK mode protocol would be part of the PDP context. If the QoS for the flow were, for example, conversational in nature, then SLC-ACK mode would not be invoked in any event so, for this case the "conversational" flow could be established easily with a packet transfer context which did not include SLC reliability. If the QoS for the flow were, for example, interactive in nature, then SLC-ACK mode may be invoked if it is available. At ST 103, if it is found that SLC-ACK mode was supported in the PDP context for ST 105, and the QoS of the flow required a reliable SLC, then ST 103 could establish the packet transfer context for the flow and proceed. If, on the other hand, the QoS required SLC-reliability but the ST 105 PDP context identified ST 105 as first generation or did not include SLC-ACK mode support, then the higher layers would be informed that the QoS requested was not supported.

According to an embodiment of the present invention, a default PDP context is established that specifies a baseline parameter, such as a SLC/MAC capability. Thus, all first generation STs do not have to store PDP context information because all future STs are required to be backward compatible to first generation STs and understand the default PDP context. Thus if the requirements on all future generation STs are accepted and pending which alternative is accepted, first generation STs may have no requirements.

Figure 3:
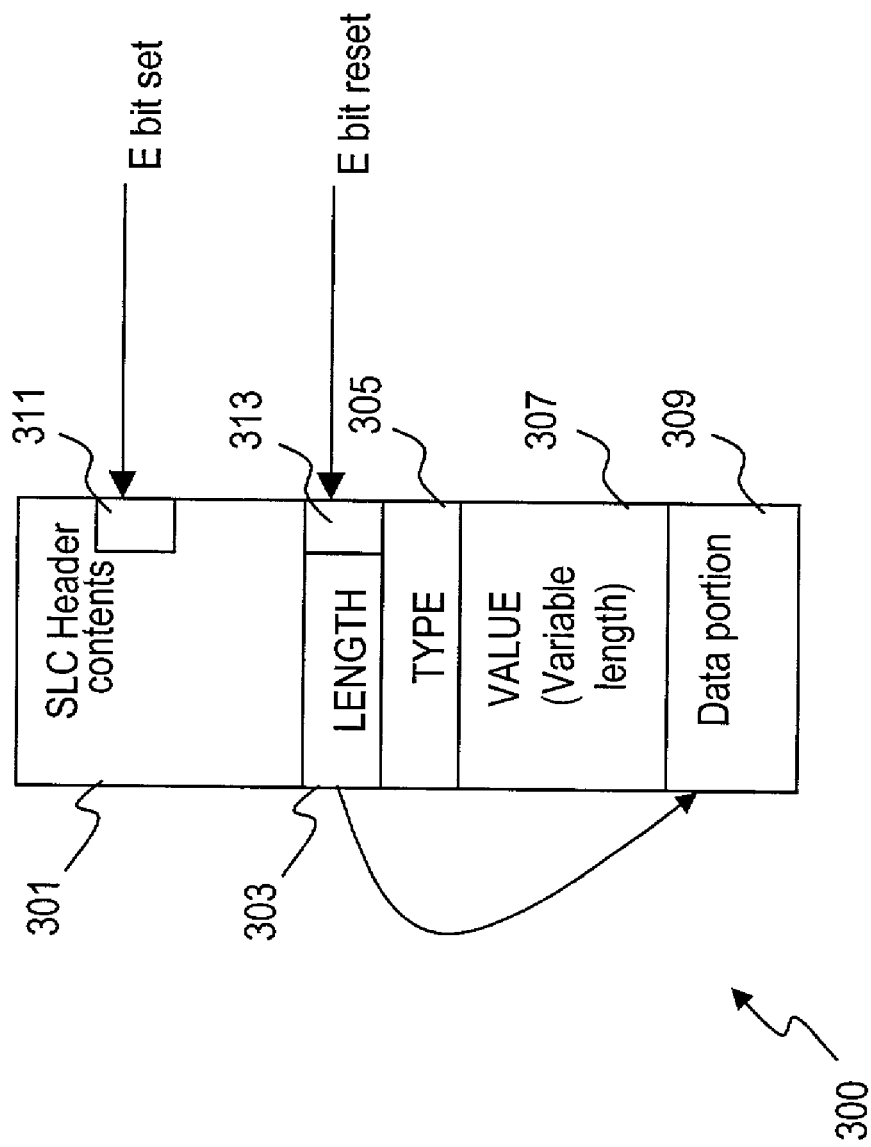
FIG. 3 is a diagram of a format of a Satellite Link Control (SLC) packet utilized in the system of FIG. 1.

FIG. 3 is a diagram of a format of a SLC packet utilized in the system of FIG. 1. An SLC packet 300, in an exemplary embodiment, includes a Header field 301, a Length field 303, a Type field 305, a Value field 307, and a Payload 309. As shown, the packet format includes a first Extension (E) bit 311 that is set to indicate that there is an extension header after the end of the mandatory header parts. The first octet of the extension header contains the length of the extension header in octets, whereas the last bit is another E bit 313. If set, the E bit 313 indicates that there is a further extension header; in the example, it is reset indicating that the data portion starts immediately after the extension bit.

When an ST detects that the E bit set in the main header, the ST attempts to process the extension header. If the type value is recognized, the ST takes appropriate action; if not, the ST examines the length field to skip the extension header. In an exemplary embodiment, the first octet of an extension header is transmitted in clear text, while the remaining packet may be encrypted. The Cyclic Redundancy Check (CRC) is computed based on the entire contents; thus if an ST does not recognize a header, the ST still has to include it when computing the CRC.

An extension to the SLC packet format is valid both in Acked mode and Unacked mode. The extension is in the header for an unfragmented packet or the header for the first part of a fragmented packet. The E bit in the main header is provided in the zero$^{th}$ bit of the third octet in SLC unacked mode (unfragmented header and header of first fragment) and the zero$^{th}$ bit of the fourth octet in SLC acked mode (unfragmented header and header of first fragment).

FIG. 4 is a diagram of a format of the header of the SLC packet utilized in the system of FIG. 1. In an exemplary embodiment, an SLC packet header 400 includes a Compression (Cmp) field 401, a Frame (Form) field 403, a Security (Sec) field 405, a CRC size field 407, a Spare field 409, and a field 411 for the E bit. If the E bit 411 is set, it indicates that there is an extension header after the Frame and Security headers, if any. The general format of an extension header is shown in FIG. 3. The most significant seven bits of the first octet contain the length in octets of the extension header, including the current octet. The next octet contains the type, in form of type-codes. Table 1 enumerates an exemplary type-code:

TABLE 1

| Meaning | Type-code | Value |
|---|---|---|
| Destination MAC address of transmitter | 0x01 | 4 octets of destination MAC address |

A value field follows the type field (as shown in FIG. 3), which is dependent on the type code being used and the particular procedure.

Figure 5:
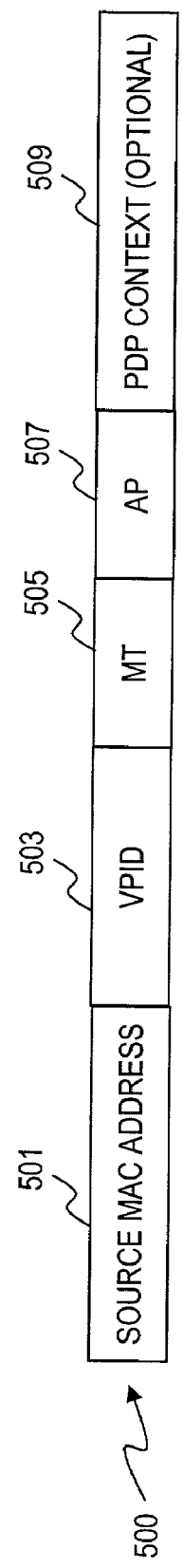
FIG. 5 is a diagram of a format of a context control message, according to one embodiment of the present invention.

FIG. 5 is a diagram of a format of a context control message, according to one embodiment of the present invention. A context control message 500 includes an address field 501, a virtual port ID (VPID) field 503, a Message Type (MT) field 505, an Attach PD context (AP) field 507, and an optional PDP context field 509. In an exemplary embodiment, the address field 501 is 18-bit and stores a source ST's MAC address, while an 8-bit VPID field 503 indicates the virtual port ID that is currently used. The address field 501, in combination with virtual port ID field 503, uniquely identifies the source ST to the destination ST. The source ST (in particular context manager) that initializes the PDP context request session sets the Source MAC address and VPID fields 501, 503, respectively.

The control message, in an exemplary embodiment, is inserted into the first SLC packet using the "extension header." The first octet of the value field shall contain the message type (MT) as shown below. If an SLC negotiation extension header is inserted in an SLC packet, the destination MAC address of the sender is also inserted in an accompanying extension header. Table 2 below enumerates exemplary message types in the PDP context control message.

Specifically, the 4-bit field MT (Message Type) field 505 indicates the particular type of this control message 500, defined as follows:

TABLE 2

| MT Value | Message Type |
|---|---|
| 0000 | Context Request |
| 0001 | Context Response |
| 0010 | Context Rejection |
| 0011 | Context Confirm |
| Other | Reserved |

The AP (Attach PDP context) field 507, in an exemplary embodiment, is a 1-bit field that dictates whether the optional PDP context field 509 is attached. The PDP context field 509 contains the actual PDP context.

To distinguish the context control message 500 from standard SLC data, the last spare bit right after the 2-bit CRC size field in the SLC-Unack mode/SLC-Ack mode header is utilized to indicate the existence of such a control message. This bit may be referred to as a PDP Context Control Message (PCCM) field, in which PCCM=1 indicates that there is such a control message, and the SLC PDU, as a whole, is denoted as SLC PDP Context Control Message (SPCCM). With the PCCM bit set, the control message 500 may be placed in the data field of a regular SLC PDU, which can contain up to 98 bytes of information in any format. It is noted that there should no regular data with the existence of such a control message.

Figure 6:
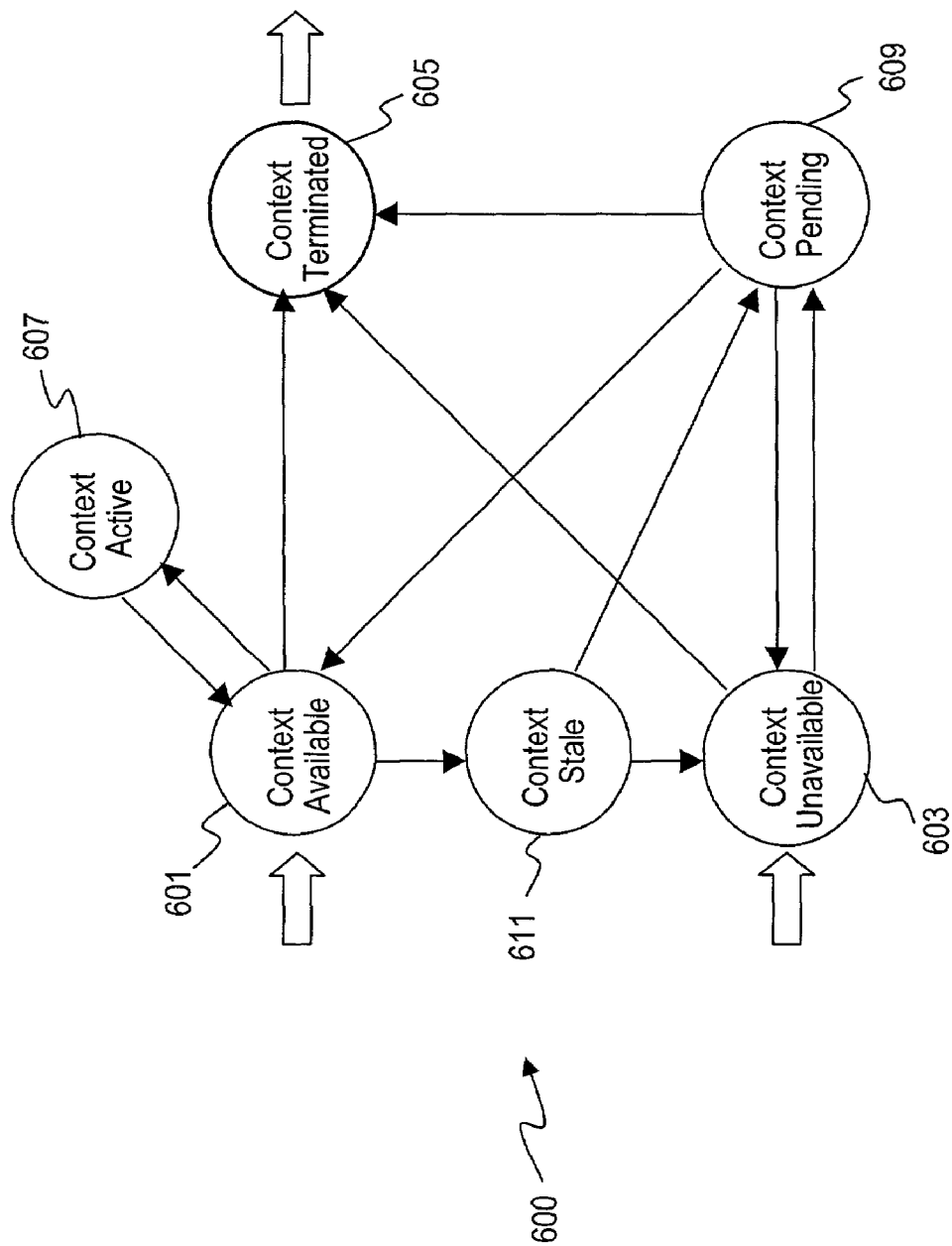
FIG. 6 is a diagram of a state machine for context negotiation, according to one embodiment of the present invention.

FIG. 6 is a diagram of a state machine for context negotiation, according to one embodiment of the present invention. For a transmit ST 103 to send packets to a receive ST 105, the transmit ST 103 first checks whether a communication context has been set up for the current session. If the packet transfer context is available, the transmit ST 103 may proceed to send packets. Otherwise, a negotiation procedure is initiated between these two STs 103, 105 to set up an appropriate packet transfer context. Specifically, the transmit ST 103 needs to obtain the PDP context information of the receive ST 105. The field format of the PDP context is determined for the information transfer, according to the data structure as previously described.

A context negotiation state machine 600 exists for each session between two STs. The initial states include a Context Available state 601 and a Context Unavailable state 603. A Context Terminated state 605 is the exit state. Thus, these states 601, 603, 605 are the interface of the state machine 600. Other states of the state machine 600 include the following: a Context Active state 607, a Context Pending state 609, and a Context Stale state 611. The Context Available state 601 is entered when a valid packet transfer context exists for the receive ST 105. Upon the expiry of the PDP context Expiry Timer (which indicates that the local PDP context information of the receive ST 105 is outdated), the state machine 600 transitions to the Context Stale state 611. The state machine 600 transitions to Context Active state 607 if a session is transmitting packets using this packet transfer context. Otherwise, the ST remains in the state 601, until the packet transfer context is deleted from the cache due to session termination.

At this point, the state machine 600 transitions to Context Terminated state 605. The state machine 600 enters this absorbing state 605 from the Context Available state 601 or optionally from the Context Pending 609 state or the Context Unavailable state 603. This transition is activated by the fire of the Session Timer (or the Transmit (Tx) Link Timer in Ack-mode) that terminates the session. The state machine 600 is in the Context Active state 607 when the packet transfer context is being used for transmitting packets. A transition to the Context Available state 601 is made when the Session Timer (or the Tx Link Timer in Ack-mode) is started. An active packet transfer context cannot be removed, and Context Available state 601 is the only state it can transition to.

The Context Pending state 609 is entered when a need for getting the PDP context for this receive ST 105 has been identified by some event within the ST. In this state 609, an attempt to obtain the PDP context of the receive ST 105 is performed. Basically, the transmit ST 103 sends a request to the receive ST 105 requesting its PDP context; such a request is referred to as a PDP context request. In turn, the receive ST 105 returns a response with the requested information (i.e., PDP context response). The transmit ST 103 then determines the appropriate context for the purpose of sending packets to the receive ST 105. The Expiry Timer and Idle Timer are set accordingly.

The above request/response message may be referred to as a PDP context control message (PCCM), as described previously. It is noted that such request/response communication is based on a universal minimum feature set, such that incompatibility issues are not a concern. The request/response procedure may include a Retry timer and counter to control the number of times the transmit ST 103 would retry the request in case of possible missing control message along the communication path.

If the negotiation is successful, the state machine 600 transitions to the Context Available state 601. If not, the state machine 600 transitions to the Context Unavailable state 603. It is noted that this state 603 may be relatively long lived, if there is no space in the cache to download a new piece of PDP context information, because all cache entries are in the active state 607.

The Context Unavailable state 603 is entered when no packet transfer context is available for the destination. Upon receiving a request to get the PDP context, the state machine 600 transitions to Context Pending state 609. Depending upon the session management policy, the state machine 600 may optionally transition to the Context Terminated state 605.

The state machine 600 transitions to the Context Stale state 611 when the PDP context Expiry Timer has fired. The system either automatically transitions to the Context Unavailable state 603 or to the Context Pending state 609; the latter state 609 is for "important" contexts that the ST retains on a more permanent basis.

With the above protocol, all major ST-ST communications can use capability negotiation. The protocol is agnostic to higher layer protocols, such as the applications, in that only the session identifier and the PDP context information of both participating STs are needed. For example, modification from IP v4 (Internet Protocol version 4) to IP v6 (Internet Protocol version 6) does not affect the protocol, since session identifier is all that is needed to start the capability negotiation. Such address change information may be included in the PDP context message field 509 (shown in FIG. 5) and addressed in the actual packet transfer context set-up procedure, which determines the most aggressive feature set for the two STs 103, 105 to communicate with each other.

The communication between two peers is based on a dynamically created packet transfer context, which is set up according to the current PDP context information of both STs. The only data flow that can travel without such a packet transfer context must use the universal minimum feature set supported by all STs. Under this approach, future extensions to the protocol can be implemented by the reserve fields.

Figure 7A:
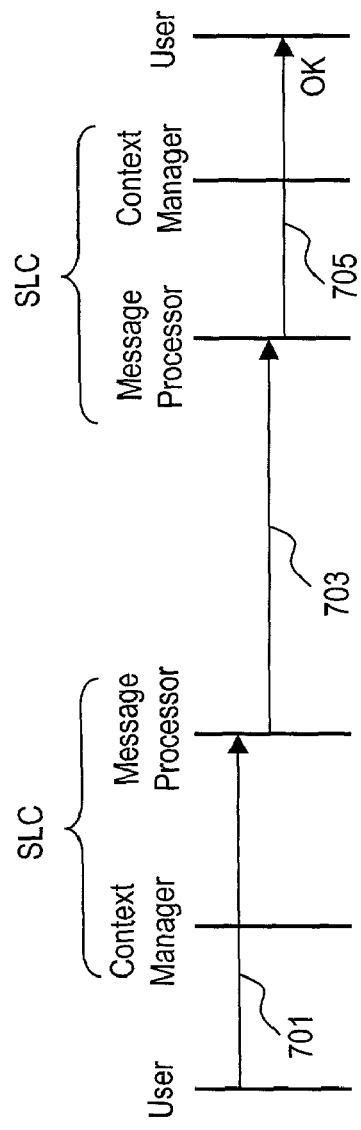
FIGS. 7a and 7b are diagrams of processes respectively for utilizing and obtaining context information, according to an embodiment of the present invention.
Figure 7B:
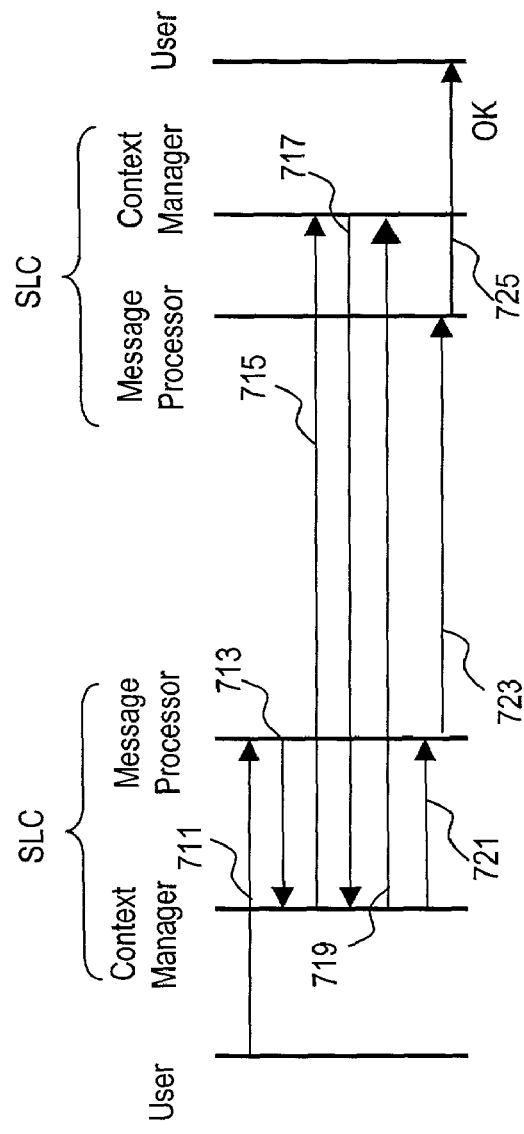

FIGS. 7*a* and 7*b* are diagrams of processes respectively for utilizing and obtaining context information, according to an embodiment of the present invention. The operation of the above protocol is described with respect to dynamic exchange of PDP context between peer STs. By way of example, four scenarios are considered, whereby FIGS. 7*a* and 7*b* represent two of the scenarios. In each case, it is assumed that a first generation ST does not implement any of the functional entities or protocols (as described below), and does not initialize any PDP context request. However, a first generation ST interprets the E bit in the SLC packet and discards all extension headers.

In this regard, each ST possesses two functional components: a Context Manager and a Message Processor (which are more fully described below). A specific control message is defined for context establishment, and the protocol uses data link layer parameters for negotiation. The protocol, in an exemplary embodiment, provides an enhanced SLC layer through the addition of these two functional components (i.e., context manager, and message processor). Each future ST locally stores the PDP context information of remote STs. If the PDP context information for a remote ST exists at a transmit ST 103, the transmit ST 103 can then create a packet transfer context for a corresponding data flow based on QoS and send the packets. If the PDP context information does not exist, the ST will request the appropriate PDP context from the remote ST, based on which a packet transfer context could be set up at the transmit ST 103 for this particular receive ST 105. Such a request is sent directly to the receive ST 105 as an SLC control message, and this control message is exchanged between the peer context managers of the peer STs.

During this communication, the sending process on the transmit ST 103 may start transmission of the data flow, but only at the default context of the first generation STs, which is defined in the common air interface and is the mandatory minimum features that all STs must support. Alternately, it may be configured not to start transmission unless the negotiation is completed—this would be the case for a VPN for example, where user encryption is negotiated. The decision of sending or waiting can be configured according to static rules concerning particular type of applications. FIG. 7b describes the PDP context request and response procedure, which illustrates the waiting case.

In the first scenario, as shown in FIG. 7a, PDP context information of the receive ST 105 exists. For purposes of explanation, the message processor is shown without explicitly pointing out the sender process or receiver process. It may be assumed that the message processor includes both the sender and receiver processes. In step 701, a User (i.e., host 109) transmits data packets to its connected transmit ST 103, in particular, a message processor. Next, the message processor within ST 103, as in step 703, finds the context of the receive ST 105, and transmits packets. The message processor at the receive ST 105 accepts the packets and delivers them to end-user 111, per step 705.

In the second scenario, PDP context information for the receive ST 105 is not known, thereby requiring a context negotiation procedure, as shown in FIG. 7b. In step 711, the User 109 sends data packets to the attached transmit ST 103, which serves as the message processor. In this case, the message processor within ST 103, as in step 713, does not find the context information of the receive ST 105, and informs its context manager. The context manager sends out the transmit ST's MAC address and virtual port ID to the receive ST 105 context manager, with the MT field set to, for example, 0000 (i.e., Context Request) along with its own ST's PDP context, per step 715. In step 717, the context manager of the receive ST 105 sends back its MAC address and PDP context, with MT set to 0001 (i.e., Context Response) and accompanied by the current context. The transmit ST's context manager sends the context confirmation message to the receive ST's context manager, per step 719.

Next, in step 721, the transmit ST's context manager notifies the message processor about the arrival of such PDP context information. In step 723, the message processor creates the packet transfer context and sends packets out. The message processor at the receive ST 105, as in step 725, accepts the packets and delivers them to end-user 111.

In another scenario, the receive ST 105 is assumed to be first generation and does not support the PDP context protocol. Under this scenario, the receive ST 105 would ignore the transmit ST 103 request. The transmit ST 103 would retry the PDP context request for a configurable number of times. Upon failure, the transmit ST 103 declares that the receive ST 105 only supports the default baseline context of all "older generation" STs and would create a packet transfer context accordingly. If this satisfied the QoS, then the packet transfer would proceed. Otherwise, failure would be indicated to the higher layers.

A In the fourth case, the transmit ST 103 finds a context for the receive ST 105 and sends packets out; the receive ST 105, however, finds a mismatch with its current PDP context. If the receive ST 105 has been upgraded in terms of capabilities then it likely supports the packet transfer context and can successfully receive the data packets. If the receive ST 105 has been upgraded in a way so as to lose capabilities, then this is an exception condition.

Figure 8:
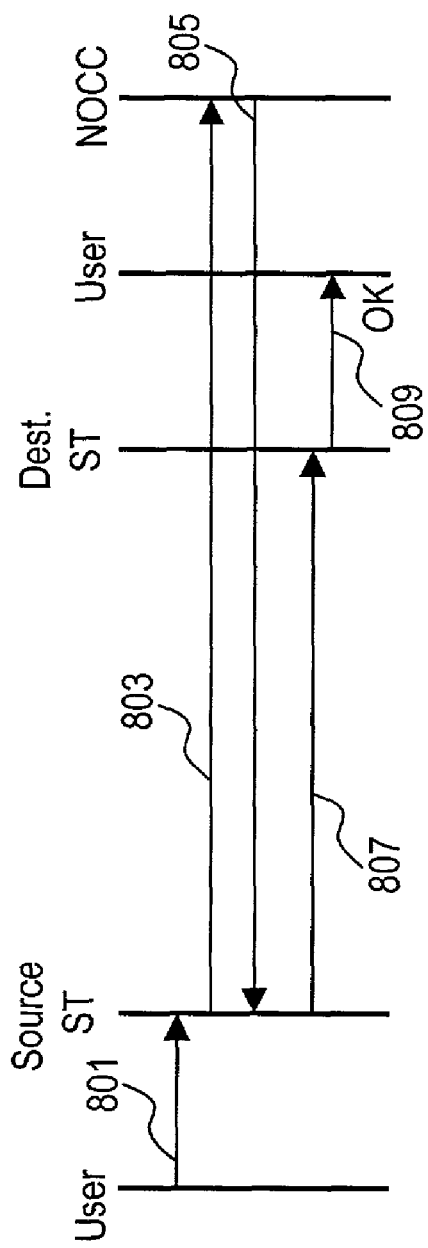
FIG. 8 is a diagram of a process for performing context negotiation in conjunction with address resolution, according to one embodiment of the present invention.

FIG. 8 is a diagram of a process for performing context negotiation in conjunction with address resolution, according to one embodiment of the present invention. In particular, the procedure for acquiring the PDP context of a remote ST is integrated with an address resolution (AR) protocol, which provides translation between protocol addresses to hardware interface addresses.

By way of example, for each ST, a local address resolution table is maintained. The address resolution table stores, in an exemplary embodiment, the MAC addresses of statically configured remote STs and/or a cache of dynamically learned address resolution. In this manner, the next time a particular ST sends data packets to those other STs, the mapping from IP address to MAC address is performed locally, and thus, is faster than remotely retrieving the address.

If the local address resolution table does not have an entry a desired destination ST, the particular ST submits a request for the physical address of the destination ST to the AR server 119 located at the NOCC 107. In turn, AR server 119 determines and returns the corresponding MAC address of the desired destination ST. In an exemplary embodiment, the PDP context information is stored with or indexed by the MAC addresses at the NOCC 107 and implemented via a composite data structure.

As shown in FIG. 8, a User host 109, as in step 801, transmits packets destined for ST 105 to the connected ST 103—i.e., source ST. The ST 103 performs a look-up for the MAC address of the destination ST 105. If this destination MAC address is not found, the source ST 103 sends a request to the NOCC 107 for the MAC address as well as the context information of the destination ST 105 using the AR protocol, per step 803. As mentioned previously, the NOCC 107 utilizes the database 113 to store the PDP context information of the STs 103, 105 in the system 100; this information is keyed based on the MAC addresses of the corresponding STs 103, 105. Because the context information is retrieved using the AR protocol, the system 100 advantageously has the scaling property of the AR protocol.

The NOCC, as in step 805, responds with the corresponding PDP context and the MAC address to source ST 103. In an exemplary embodiment, the ARP messages include the PDP context information. Next, in step 807, the Source ST 103 sends packet out to the destination ST 105 using the appropriately created packet transfer context. Accordingly, the Destination ST 105 receives the packets and delivers them to host 111.

Figure 10:
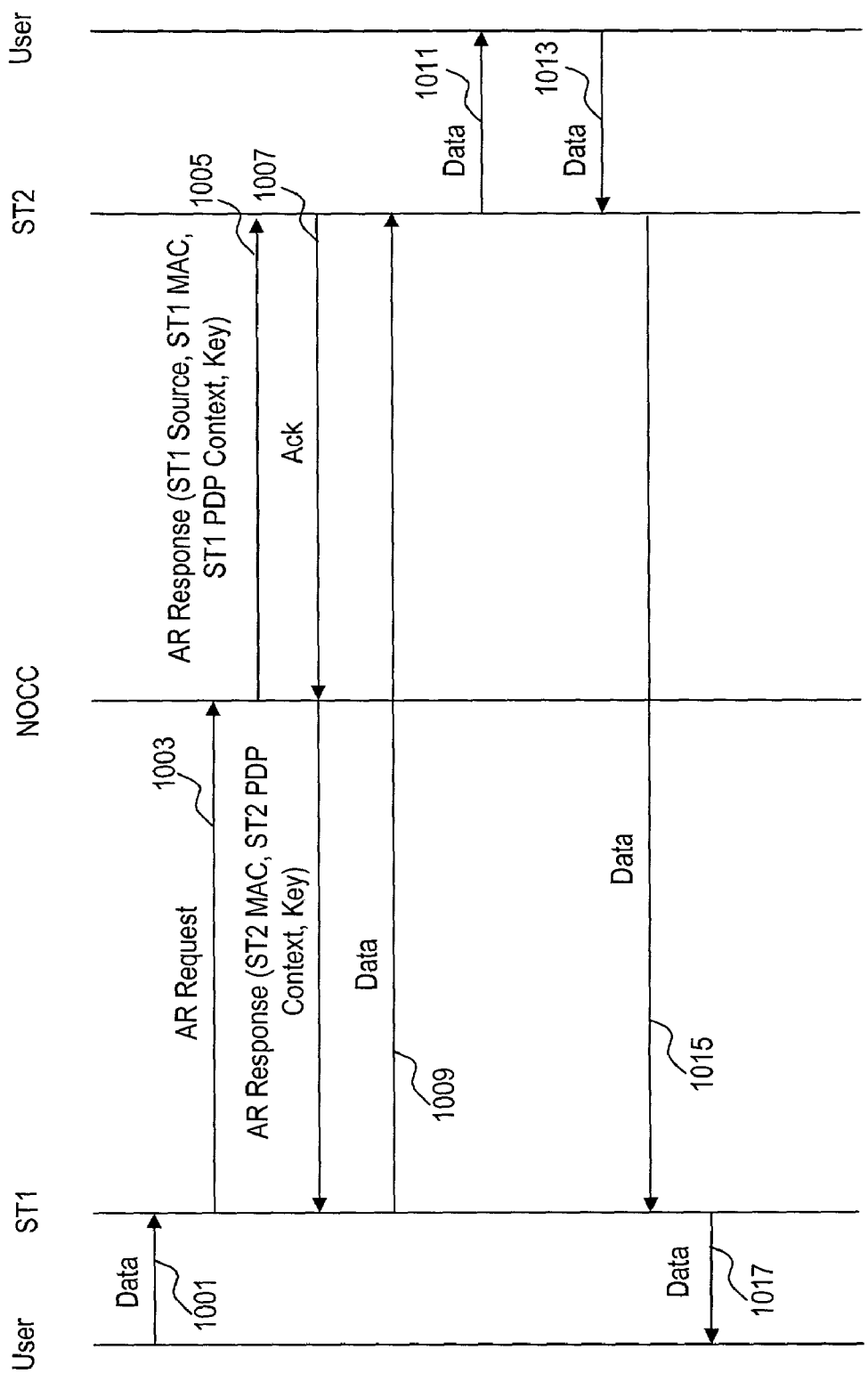
FIG. 10 is a diagram of a process for securely performing context negotiation and address resolution, according to one embodiment of the present invention.

By utilizing the NOCC 107, the above approach supports increased security functionalities, as more fully described with respect to FIG. 10. Additionally, because the context negotiation procedure is performed with the assistance of the NOCC 107, traffic management capabilities are enhanced.

For example, the NOCC 107 may perform checks on communities of interest (COI) traffic, if any such associations are established.

Figure 9:
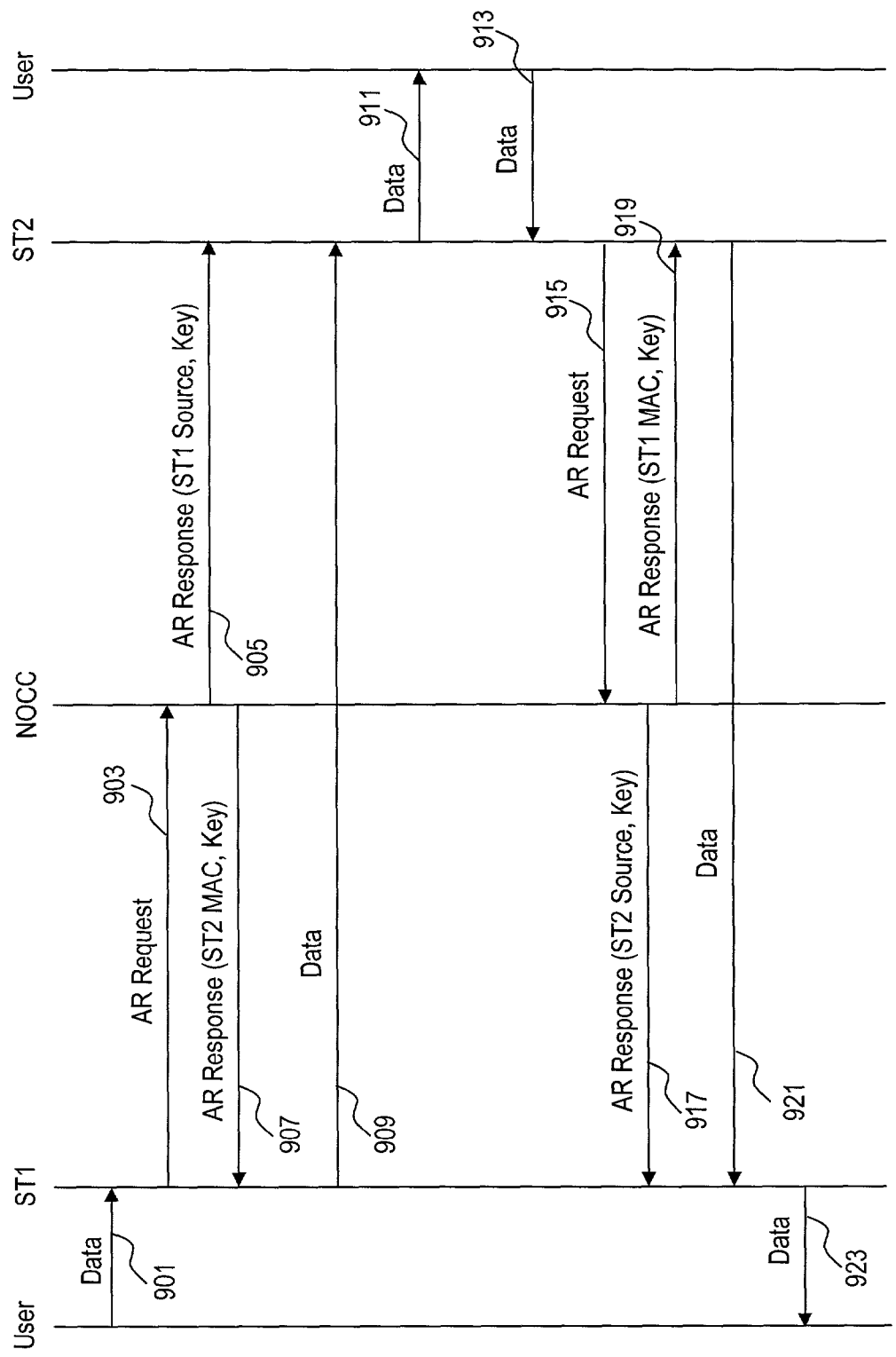
FIG. 9 is a diagram of a secure address resolution process that may be used in the system of FIG. 1.

FIG. 9 is a diagram of a secure address resolution process that may be used in the system of FIG. 1. In step 901, the ST 103 (i.e., ST1) receives data from the connected host 109 and submits an Address Resolution (AR) request to the NOCC 107 (step 903). The NOCC 107 sends an AR response, as in step 905, to the destination ST 105 (i.e., ST2); the response includes the source address (e.g., IP address) of the source ST 103 along with a public key of the ST 103. The NOCC 107 also sends an AR response that includes the MAC address of the destination ST 105 along with the public key of the destination ST 105. The ST 103 then encrypts the data from the host 109 with the public key of the destination ST 105, and directly forwards the data to the ST 105, per step 909. Next, the destination ST 105 forwards the data to the destination host 111, per step 911.

At this point, the host 111 has data of its own to send to the source host 109. Consequently, the host 111 transmits the data to the ST 105, which in this example, does not have the MAC address information of the ST 103, and thus, sends an AR request to the NOCC 107, per step 915. Similar to steps 905 and 907, the NOCC 107 responds to the STs 103, 105, respectively, with an AR response that includes the protocol address of the ST 105 and associated public key (per step 917), and an AR response that contains the MAC address of the ST 103 along with the public key of the ST 103 (per step 919). In step 919, the ST 105 proceeds to encrypt the data from the host 111 with the public key of ST 103, and forwards the encrypted data to the ST 103. The ST 103 then forwards the data to the host 109.

The above process is modified, according to an embodiment of the present invention, to exchange context information, as next described in FIG. 10.

FIG. 10 is a diagram of a process for securely performing context negotiation and address resolution, according to one embodiment of the present invention. In this scenario, the ST 103, as the source ST, transmits an AR request to the NOCC 107 upon receiving data from the host 109, per steps 1001 and 1003. Unlike the process of FIG. 9, the NOCC 107 includes the respective PDP context information in the AR responses to the destination ST 105 and the source ST 103. That is, the NOCC 107 sends, as in step 1005, an AR response that includes the source address of the ST 103, the MAC address of the ST 103, the PDP context information of the ST 103, and the public key of ST 103. In step 1007, the destination ST acknowledges the received PDP context information with the NOCC 107, which in turn, forwards an AR response containing the following information of the ST 105 to the source ST 103: MAC address, PDP context information, and public key.

Thus, the ST 103 may begin transmission of data to the destination ST 105, per step 1009. Upon receiving the data, the ST 105 forwards the data to the destination host 1011. Further, the host 111 may respond with data of its own to the ST 105, as in step 1013. Next, the ST 105 forwards the data to the ST 103, as in step 1015. This data is then forwarded to the host 109, per step 1017.

The above process provides secure exchange of context information, while permitting utilization of standard protocols.

Figure 11:
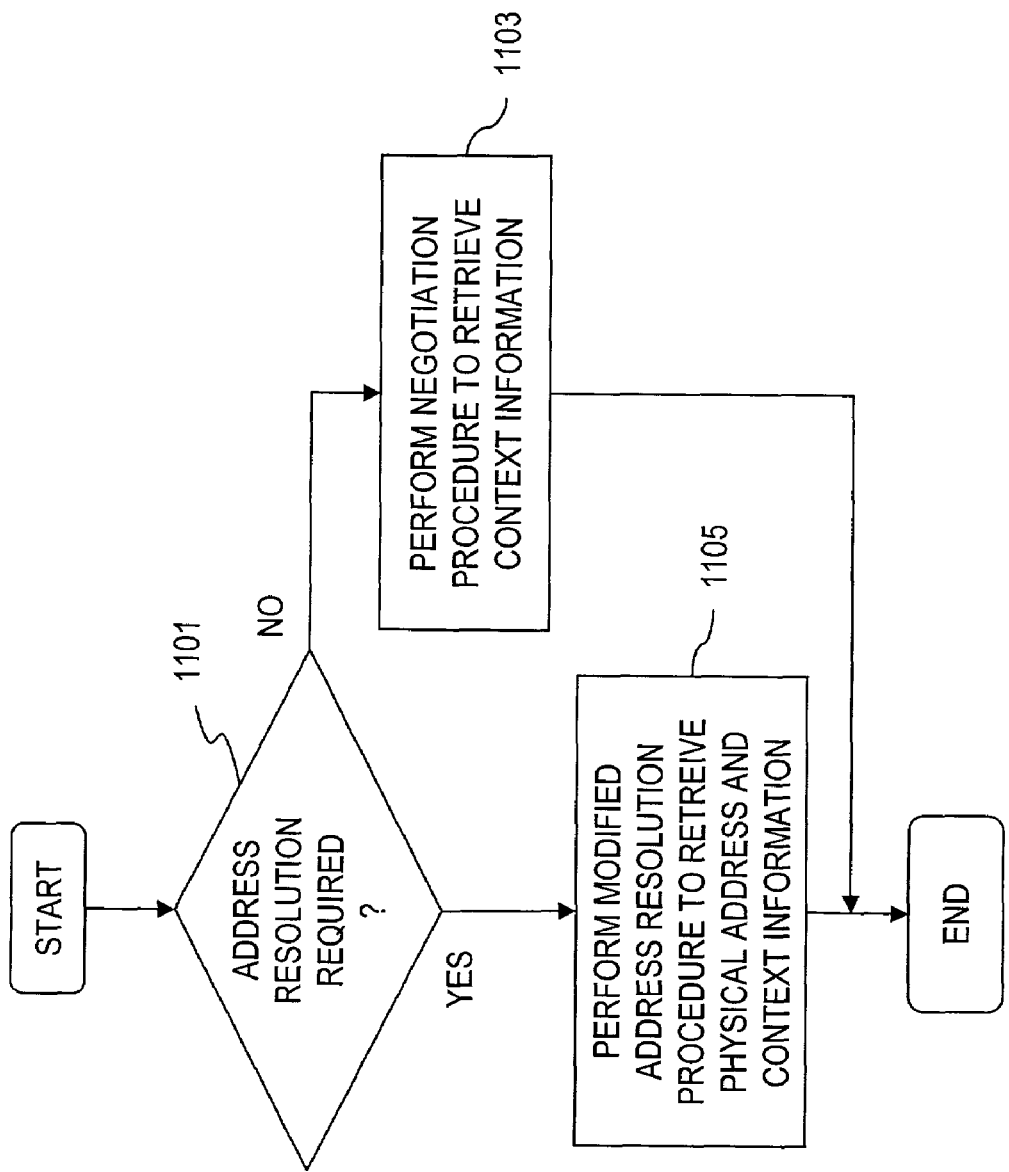
FIG. 11 is a diagram of a process for performing context negotiation that utilizes a hub for assistance when address resolution is required, according to one embodiment of the present invention.

FIG. 11 is a diagram of a process for performing context negotiation that utilizes a hub for assistance when address resolution is required, according to one embodiment of the present invention. The processes of FIGS. 7a and 7b and FIG. 10 provide different advantages, such as scalability and security. Under this scenario, the source ST 103 determines whether it possesses the physical address of the destination ST 105 by performing a look-up in its local address resolution table. If address resolution is required, per step 1101, then the negotiation procedure along with the address resolution process of FIG. 10 is performed (step 1103). However, if the ST 103 does not require performing address resolution, then the peer-to-peer context negotiation procedure of FIGS. 7a and 7b is executed. This approach advantageously provides improved security, while enhancing scalability.

Figure 12:
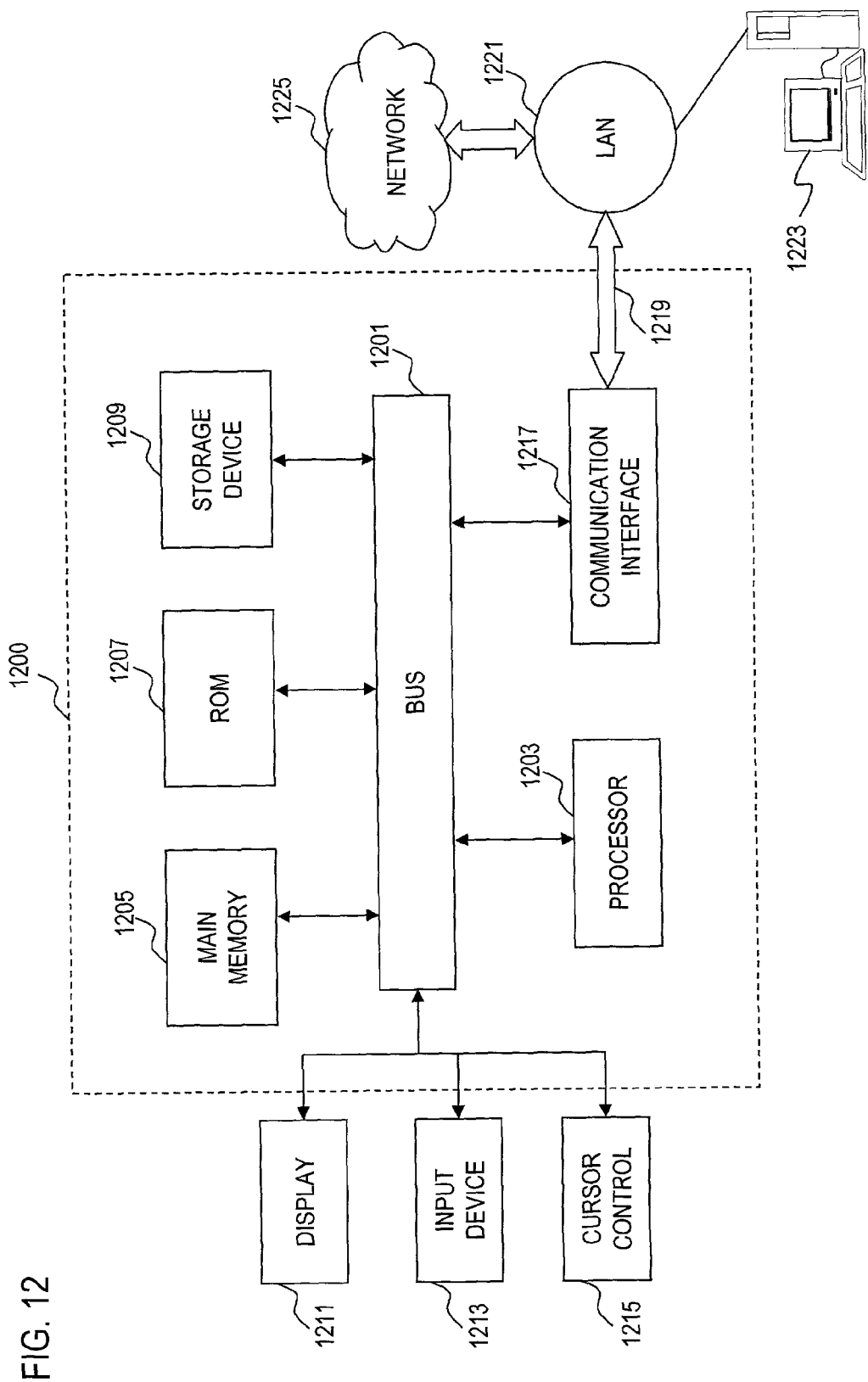
FIG. 12 is a diagram of a computer system that can perform context negotiation, in accordance with an embodiment of the present invention.

FIG. 12 illustrates a computer system 1200 upon which an embodiment according to the present invention can be implemented. The computer system 1200 includes a bus 1201 or other communication mechanism for communicating information, and a processor 1203 coupled to the bus 1201 for processing information. The computer system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions to be executed by the processor 1203. The computer system 1200 further includes a read only memory (ROM) 1207 or other static storage device coupled to the bus 1201 for storing static information and instructions for the processor 1203. A storage device 1209, such as a magnetic disk or optical disk, is additionally coupled to the bus 1201 for storing information and instructions.

The computer system 1200 may be coupled via the bus 1201 to a display 1211, such as a cathode ray tube (CRT), liquid crystal display, active matrix display, or plasma display, for displaying information to a computer user. An input device 1213, such as a keyboard including alphanumeric and other keys, is coupled to the bus 1201 for communicating information and command selections to the processor 1203. Another type of user input device is cursor control 1215, such as a mouse, a trackball, or cursor direction keys for communicating direction information and command selections to the processor 1203 and for controlling cursor movement on the display 1211.

According to one embodiment of the invention, the context negotiation procedures of FIGS. 7a, 7b, 8, 10, and 11 are provided by the computer system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the present invention. Thus, embodiments of the present invention are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, or a telephone modem to provide a data communication connection to a corresponding type of telephone line. As another example, communication interface 1217 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a PCMCIA (Personal Computer Memory Card International Association) interface, etc.

The network link 1219 typically provides data communication through one or more networks to other data devices. For example, the network link 1219 may provide a connection through local network 1221 to a host computer 1223, which has connectivity to a network 1225 (e.g. a wide area network (WAN) or the global packet data communication network now commonly referred to as the "Internet") or to data equipment operated by service provider. The local network 1221 and network 1225 both use electrical, electromagnetic, or optical signals to convey information and instructions. The signals through the various networks and the signals on network link 1219 and through communication interface 1217, which communicate digital data with computer system 1200, are exemplary forms of carrier waves bearing the information and instructions.

The computer system 1200 can send messages and receive data, including program code, through the network(s), network link 1219, and communication interface 1217. In the Internet example, a server (not shown) might transmit requested code belonging to an application program for implementing an embodiment of the present invention through the network 1225, local network 1221 and communication interface 1217. The processor 1203 may execute the transmitted code while being received and/or store the code in storage device 129, or other non-volatile storage for later execution. In this manner, computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as storage device 1209. Volatile media include dynamic memory, such as main memory 1205. Transmission media include coaxial cables, copper wire and fiber optics, including the wires that comprise bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, an approach is provided for maintaining interoperability among multiple terminals, which may be of differing types and capabilities, in a meshed network. Through a context negotiation procedure, the terminals learn of the other terminals' capabilities. The capabilities may relate to data link layer functionalities, including an encryption scheme, a compression scheme, a segmentation and reassembly (SAR) scheme, and Quality-of-Service (QoS) parameters. A terminal requesting the context information of a destination terminal may submit a request for the context information as well as address information (e.g., Medium Access Control (MAC) address) during an address resolution procedure. If the address information is available and only the context information is needed, the context negotiation procedure is performed on a peer-to-peer basis, in which the terminals directly communicate with each other to convey the context information. According to one embodiment of the present invention, the terminals are Very Small Aperture Terminals (VSATs) and are configured to provide connectivity to multiple hosts to a data communications network, such as an Internet Protocol (IP)-based network. Under this arrangement, obsolescence of terminals is advantageously minimized. Additionally, this arrangement advantageously facilitates transparent introduction of new terminals with improved features and functionalities, while providing compatibility with older terminals. Furthermore, communications through the hub permits implementation of security and traffic management functions.

While the present invention has been described in connection with a number of embodiments and implementations, the present invention is not so limited but covers various obvious modifications and equivalent arrangements, which fall within the purview of the appended claims.

What is claimed is:

1. A method for retrieving compatibility context information over a meshed network, the method comprising:
  generating a request for obtaining address information for establishing a communication connection with a terminal;
  setting up the communication connection with a transmission mode set for acceptance with the capabilities of the terminal;
  transmitting the request to a hub within the meshed network;
  receiving a response from the hub, wherein the response includes the address information and the compatibility context information that specifies capabilities of the terminal, and the response is received prior to establishing said communication connection;
  receiving data from a host; and
  transmitting a packet containing the data to the terminal according to the compatibility context information of the terminal if the terminal is a part of a specified community of interest.

2. The method according to claim 1, wherein the meshed network is a satellite network.

3. The method according to claim 1, wherein the response includes public key information associated with the terminal, the method further comprising:
encrypting the received data according to the public key information.

4. The method according to claim 1, wherein the capabilities include at least one of an encryption scheme, a compression scheme, a segmentation and reassembly scheme, and Quality-of-Service (QoS) parameters.

5. A terminal apparatus for compatibility retrieving compatibility context information over a meshed network, the apparatus comprising:
a processor configured to generate a request for obtaining address information for establishing a communication connection with a terminal and set up the communication connection with a transmission mode set for acceptance with the capabilities of the terminal, wherein the request is forwarded to a hub within the meshed network; and
a communications interface configured to receive a response from the hub, the response including the address information and the compatibility context information that specifies capabilities of the terminal, and the response is received prior to establishing said communication connection,
wherein the communications interface is further configured to transmit a packet containing data received from a host to the terminal according to the compatibility context information of the terminal if the terminal is a part of a specified community of interest.

6. The apparatus according to claim 5, wherein the meshed network is a satellite network.

7. The apparatus according to claim 5, wherein the response includes public key information associated with the terminal for encrypting the received data.

8. The apparatus according to claim 5, wherein the capabilities include at least one of an encryption scheme, a compression scheme, a segmentation and reassembly scheme, and Quality-of-Service (QoS) parameters.

9. A computer-readable storage medium carrying one or more sequences of one or more instructions for retrieving compatibility context information over a meshed network, when executed by one or more processors, cause the one or more processors to perform the steps of:
generating a request for obtaining address information of a terminal for establishing a communication connection;
setting up the communication connection with a transmission mode set for acceptance with the capabilities of the terminal;
transmitting the request to a hub within the meshed network;
receiving a response from the hub, wherein the response includes the address information and the compatibility context information that specifies capabilities of the terminal and the response is received prior to establishing the communication connection;
receiving data from a host; and
transmitting a packet containing the data to the terminal according to the compatibility context information of the terminal if the terminal is a part of a specified community of interest.

10. The computer-readable storage medium according to claim 9, wherein the meshed network is a satellite network.

11. The computer-readable storage medium according to claim 9, wherein the response includes public key information associated with the terminal, the one or more processors further performing the steps of:
encrypting the received data according to the public key information.

12. The computer-readable storage medium according to claim 9, wherein the capabilities include at least one of an encryption scheme, a compression scheme, a segmentation and reassembly scheme, and Quality-of-Service (QoS) parameters.

13. A device having a processor for retrieving compatibility context information over a meshed network, the device comprising:
means for generating a request for obtaining address information of a terminal for establishing a communication connection;
means for setting up the communication connection with a transmission mode set for acceptance with the capabilities of the terminal;
means for transmitting the request to a hub within the meshed network;
means for receiving a response from the hub, wherein the response includes the address information and the compatibility context information that specifies capabilities of the terminal, and the response is received prior to establishing said communication connection;
means for receiving data from a host; and
means for transmitting a packet containing the data to the terminal according to the compatibility context information of the terminal if the terminal is a part of a specified community of interest.

14. The device according to claim 13, wherein the meshed network is a satellite network.

15. The device according to claim 13, wherein the response includes public key information associated with the terminal, the device further comprising:
means for encrypting the received data according to the public key information.

16. The device according to claim 13, wherein the capabilities include at least one of an encryption scheme, a compression scheme, a segmentation and reassembly scheme, and Quality-of-Service (QoS) parameters.

17. A method for retrieving compatibility context information over a meshed network, the method comprising:
determining whether address information of a terminal is stored locally;
setting up a communication connection with a transmission mode set for acceptance with the capabilities of the terminal;
selectively generating a request, based on the determining step, for the address information and the compatibility context information that specifies capabilities of the terminal, wherein the request is forwarded to a hub within the meshed network and a response to the request is received from the hub prior to establishing the communication connection to the terminal, wherein the response includes the address information and the compatibility context information that specifies capabilities of the terminal;
receiving data from a host; and
transmitting a packet containing the data to the terminal according to the context information of the terminal if the terminal is a part of a specified community of interest.

18. The method according to claim 17, wherein the meshed network is a satellite network.

19. The method according to claim 17, wherein the response includes public key information associated with the terminal, the method further comprising:
encrypting the received data according to the public key information.

20. The method according to claim 17, wherein the capabilities include at least one of an encryption scheme, a compression scheme, a segmentation and reassembly scheme, and Quality-of-Service (QoS) parameters.

21. The method according to claim 17, wherein the request in the generating step is generated according to an Address Resolution Protocol (ARP).

22. The method according to claim 17, further comprising: communicating directly with the terminal to obtain the compatibility context information of the terminal, if the address information is stored locally.

23. A computer-readable storage medium carrying one or more sequences of one or more instructions for retrieving compatibility context information over a meshed network, when executed by one or more processors, cause the one or more processors to perform the steps of:
determining whether address information of a terminal is stored locally;
setting up a communication connection with a transmission mode set for acceptance with the capabilities of the terminal;
selectively generating a request, based on the determining step, for the address information and the compatibility context information that specifies capabilities of the terminal, wherein the request is forwarded to a hub within the meshed network and a response to the request is received from the hub prior to establishing the communication connection to the terminal, wherein the response includes the address information and the compatibility context information that specifies capabilities of the terminal;
receiving data from a host; and
transmitting a packet containing the data to the terminal according to the compatibility context information of the terminal if the terminal is a part of a specified community of interest.

24. The computer-readable storage medium according to claim 23, wherein the meshed network is a satellite network.

25. The computer-readable storage medium according to claim 23, wherein the response includes public key information associated with the terminal, and the one or more processors further perform the step of:
encrypting the received data according to the public key information.

26. The computer-readable storage medium according to claim 23, wherein the capabilities include at least one of an encryption scheme, a compression scheme, a segmentation and reassembly scheme, and Quality-of-Service (QoS) parameters.

27. The computer-readable storage medium according to claim 23, wherein the request in the generating step is generated according to an Address Resolution Protocol (ARP).

28. The computer-readable storage medium according to claim 23, wherein the one or more processors further perform the steps of:
communicating directly with the terminal to obtain the compatibility context information of the terminal, if the address information is stored locally.

* * * * *